US009327776B2

(12) United States Patent
Dieckmann et al.

(10) Patent No.: US 9,327,776 B2
(45) Date of Patent: May 3, 2016

(54) REAR SPOILER SYSTEM FOR A VEHICLE

(71) Applicant: WABCO GmbH, Hannover (DE)

(72) Inventors: Thomas Dieckmann, Pattensen (DE);
David Inkermann, Braunschweig (DE);
Christopher Neumann, Alfeld (DE);
Rouven Petzold, Braunschweig (DE);
Ralf Wokoeck, Braunschweig (DE);
Frank Zielke, Barsinghausen (DE)

(73) Assignee: WABCO GmbH, Hannover (DE)

( * ) Notice: Subject to any disclaimer, the term of this patent is extended or adjusted under 35 U.S.C. 154(b) by 0 days.

(21) Appl. No.: 14/401,740

(22) PCT Filed: May 31, 2013

(86) PCT No.: PCT/EP2013/001606
§ 371 (c)(1),
(2) Date: Nov. 17, 2014

(87) PCT Pub. No.: WO2013/178365
PCT Pub. Date: Dec. 5, 2013

(65) Prior Publication Data
US 2015/0097393 A1  Apr. 9, 2015

(30) Foreign Application Priority Data
Jun. 2, 2012  (DE) .......................... 10 2012 011 080

(51) Int. Cl.
*B62D 35/00*  (2006.01)
(52) U.S. Cl.
CPC ............ *B62D 35/001* (2013.01); *B62D 35/007* (2013.01)
(58) Field of Classification Search
CPC ........................... B62D 35/001; B62D 35/007
USPC ...................... 296/180.1, 180.4, 180.5, 181.5
See application file for complete search history.

(56) References Cited

U.S. PATENT DOCUMENTS

| 3,960,402 | A | * | 6/1976 | Keck | .................... | B62D 35/001 |
| | | | | | | 105/1.2 |
| 4,214,787 | A | | 7/1980 | Chain | | |
| 4,458,936 | A | | 7/1984 | Mulholland | | |
| 5,498,059 | A | | 3/1996 | Switlik | | |
| 6,485,087 | B1 | * | 11/2002 | Roberge | ............... | B62D 35/001 |
| | | | | | | 296/180.4 |
| 7,950,720 | B2 | * | 5/2011 | Skopic | ................. | B62D 35/001 |
| | | | | | | 105/1.3 |
| 2009/0179456 | A1 | * | 7/2009 | Holubar | ............... | B62D 35/001 |
| | | | | | | 296/180.4 |
| 2011/0084516 | A1 | * | 4/2011 | Smith | .................. | B62D 35/001 |
| | | | | | | 296/180.4 |
| 2011/0148140 | A1 | * | 6/2011 | Benton | ................ | B62D 35/001 |
| | | | | | | 296/180.1 |

FOREIGN PATENT DOCUMENTS

| DE | 10228658 | A1 | 1/2004 |
| DE | 202009014510 | U1 | 10/2009 |
| DE | 102008036888 | A1 | 2/2010 |
| DE | 202009015009 | U1 | 2/2010 |
| DE | 202009014476 | U1 | 3/2010 |
| WO | 2008/024386 | A2 | 2/2008 |
| WO | 2011/019768 | A2 | 2/2011 |

* cited by examiner

*Primary Examiner* — Jason S Morrow
*Assistant Examiner* — E Turner Hicks
(74) *Attorney, Agent, or Firm* — Brinks Gilson & Lione

(57) ABSTRACT

A rear spoiler device (10) for a vehicle (1) has at least one rear door (8, 9), wherein the rear spoiler device (10) has at least one side spoiler (16, 17) with at least one side air guide element (32), which can be moved between a driving position for contour extension and aerodynamic air guidance when the rear door (8, 9) is closed, and a base position when the rear door (8, 9) is open. The side spoiler (16, 17) furthermore has a swing arm (30) with a first pivot joint (31) for pivotable fixation to the rear door (8, 9), the side air guide element (32) is mounted pivotably on the swing arm (30) via at least one second pivot joint (34), and the side air guide element (32) has a locking arrangement on its front end region (32*a*) for releasable and lockable fixation to the truck (1).

19 Claims, 4 Drawing Sheets

REAR SPOILER SYSTEM FOR A VEHICLE

TECHNICAL FIELD

The invention concerns a rear spoiler device for a vehicle, in particular a truck, and an arrangement of a truck with such a rear spoiler device.

BACKGROUND

Rear spoilers serve to improve the aerodynamics of the vehicle and can reduce fuel consumption accordingly. They are mounted in the rear area of the vehicle and generally have air guide elements which extend the contours of the vehicle towards the rear, e.g. with curved surfaces. Such rear spoilers can be fixed to the roof or to the side walls.

German Utility Models DE 20 2009 014 476 U1, DE 20 2009 014 510 U1, and DE 20 2009 015 009 U1 disclose rear spoiler configurations in which the air guide elements or spoiler elements are arranged movably or pivotably in order to allow unhindered opening of the door.

Pivotable or foldable rear spoilers are generally attached to the hinges of the rear door. DE 102 28 658 A1 discloses various folding solutions in which flat faces in the driving area, pivotable via a hinge, achieve an aerodynamic optimization.

DE 10 2008 036 888 A1 shows configurations of rear spoilers and connections to the vehicle, in which it is provided amongst others to mount a carrier between the rear door and the air guide element which can be moved aside for positioning the door in the largely open position. When the tailgate is swung out about its vertical pivot axis, the air guide element is thus initially pivoted with this until it reaches the outer faces of the side wall. On further opening of the tailgate, the flexible carrier element is compressed accordingly.

Such attachments of the air guide elements in the hinge region generally allow a relocation of the air guide element between the rear door and side wall when the rear door is pivoted outward through 270°, as is often the case in trucks, in order to be attached for example to the side wall.

Such systems are however generally very complex. They comprise amongst others complex pivot or hinge designs. Furthermore some rear spoiler systems only allow the use of relatively short air guide elements, whereby the improvement to the aerodynamics is limited.

Furthermore when the rear doors are pivoted, the construction space available in the hinge region of the rear door is very constricted, so more complex rear spoiler configurations may impinge on the 270° opening process.

SUMMARY OF THE INVENTION

The invention is based on the object of creating a rear spoiler design which can be constructed with relatively little cost and allows a safe transition between the driving position and the base position.

This object is achieved by a rear spoiler device having at least one side spoiler with at least one side air guide element, which can be moved between a driving position for contour extension and aerodynamic air guidance when the rear door is closed, and a base position when the rear door is open. The side spoiler has a swing arm with a first pivot joint for pivotable fixation on the rear door, the side air guide element is mounted adjustably via the swing arm on the rear door, and the side air guide element has a locking arrangement on its front end region for releasable and lockable fixation to the truck.

Furthermore an arrangement is described of a truck and such a rear spoiler device mounted in the rear region.

According to the invention, the rear spoiler device thus has at least one side spoiler for mounting on the rear door. With the conventional design of a vehicle rear with two laterally pivoting rear doors, the rear spoiler device therefore has two side spoilers, each of which is mounted on one of the rear doors.

The side air guide element of the side spoiler can be mounted on the rear door via an additional swing arm. The swing arm can be mounted on the rear door via a first pivot joint, in particular a vertical first rotary axis with multiple pivot joints. The side air guide element is preferably pivoted on the swing arm via a second rotary axis. The second rotary axis is therefore advantageously formed on or between the rear (in the driving position) end of the side air guide element and the rear (in the driving position) end of the swing arm. Advantageously for this, multiple vertically spaced second pivot joints are formed between the end regions of the swing arm and the air guide element.

The side air guide element is preferably releasably locked to the vehicle via a locking arrangement formed at its front end.

Thus a lockable arrangement is formed which can be pivoted or adjusted after release. The side air guide element can in particular terminate flush with or align with the corresponding side wall of the vehicle. In contrast to conventional connections of the side air guide element at the hinge, the side air guide element is however unlockable at its front end region so that, after unlocking, it can be pivoted about the swing arm and with the swing arm towards the middle of the rear door.

This in itself achieves some advantages. The otherwise constricted space available in the hinge region of the rear door is not filled or not filled to a relevant extent; after unlocking, the side air guide element can be pivoted in towards the middle about the swing arm, so that the entire rear door can then be pivoted outward through e.g. around 270°, and for example be laid against or fixed to the side wall. The side spoiler with side air guide element and swing arm is therefore accommodated between the rear door and the side wall with no disruptive effect in the hinge region. The total length of the swing arm and side air guide element can for example be selected such that the side spoiler, fully folded into the base position, extends approximately to the door edge (middle of the vehicle rear); in this way the fixation of the rear door to the side wall is not hindered by the side spoiler.

The first pivot joint of the swing arm is advantageously mounted on the rear door at a sufficient distance from the hinge, e.g. 10 cm or more from the rear door hinge. For fixing, e.g. holes can be drilled in the rear door which are then sealed again by the first pivot joints.

According to alternative embodiments, the retainable locking arrangement on the front end of the side air guide element can be arranged on the vehicle structure or the side walls, or also on the rear door or door leaf. In all cases, in the driving position with the rear door closed, a stable triangle is formed, the sides of which are formed by the swing arm, the side air guide element and the vehicle, and the corners of which are formed by the at least one first pivot joint, the second pivot joint and the locking means.

This configuration forms the basis of the concept according to the invention, that a formation of such a triangle is stable, even when two or even three of the corners are formed by pivot joints or pivot bearings. There is therefore no need to lock the first and second pivot joints. According to the invention, the resulting configuration also prevents or reduces flutter or flexible vibration of the side air guide elements during travel, since the side air guide element is locked at its front end region and held at its rear end by the swing arm. Thus the material of the side air guide element can optionally be selected freely, e.g. also thinner than in conventional configurations in which the air guide element is not attached at the rear.

To ensure sufficient stability, the swing arm can for example also be formed with a rib structure or recesses to reduce the amount of material and the weight. As a whole, a relatively low weight and low production costs result.

Such a side spoiler according to the invention allows mounting on different door variants and systems; in particular, the precise configuration of the rear door hinge—which can vary greatly between different manufacturers and vehicle types—is not relevant; merely fixings need be provided for the first pivot bearing on the rear door, e.g. by drilling holes, and a retaining receiver for the locking arrangement on the front end or front edge of the lateral side air guide element.

According to one configuration, the front end of the air guide element can be locked to the vehicle on the rear door itself. Thus the stable triangle formed in the driving position is formed by the swing arm, side air guide element and rear door. To allow a flush connection of the side air guide element to the side wall, for this for example a connecting arrangement which is mounted in the region of the front edge of the side air guide element, e.g. a connecting tab, can extend laterally up to a retaining receiver on the rear door. Thus even when the air guide element is attached to the rear door, a fixed termination of the front end region of the side air guide element can be achieved with favorable aerodynamic properties and no tendency to flutter. The locking arrangement can e.g. be formed as an eyelet or receiver hole, the retaining receiver can be formed as a fixation pin on the rear door.

In an alternative embodiment, the side air guide element can be attached at its front end not to the rear door but to the vehicle structure, i.e. the so-called portal of the rear region of the vehicle, or also to the side walls (if the vehicle has solid side walls). In such a configuration, an automatic release of the locking mechanism is possible when the rear door is opened, since the position of the first rotary axis in relation to the locking arrangement changes when the rear door swings open. This automatic release can for example take place by the pivot process in that the side air guide element is pivoted with its front locking arrangement into the catch receiver.

According to a particularly preferred embodiment, in addition to the side spoiler at least one roof spoiler is provided, preferably a roof spoiler on each rear door, with a roof air guide element which preferably can be moved automatically between a driving position and a folded base position. Advantageously the roof spoiler is fixed exclusively to the rear door or door leaf of the rear door. For this the roof spoiler preferably has a fixing device for fixation to the rear door, in relation to which the rear roof guide element can be pivoted. For the automatic movement, a support means, in particular a cam, is formed for example on the roof air guide element and protrudes e.g. to the rear in the base position, and on closure of the rear door comes into contact with the vehicle structure so that on further closing of the rear door, it moves e.g. by rolling on the vehicle structure, and thus a pivot moment is exerted on the roof air guide element which pivots this upward into its driving position.

The fixing device can for example be placed in the rear door or door leaf of the rear door mainly or even exclusively from above; if the rear door is closed on its top, corresponding holes can first be drilled in this. The fixing device can e.g. have vertically running insert rods which engage in the holes of the rear door.

As an alternative to this configuration with a rigid coupling between the cam and the roof air guide element, in which thus the roof air guide element always protrudes to the rear when the rear door is closed, in principle it is also possible for the roof air guide element to be able to be released and folded down manually when the rear doors are closed, e.g. to improve the space-saving parking of the vehicle and transport by rail or ship.

Some advantages result from the roof spoiler according to the invention. Advantageously no fixation of the roof spoiler to the vehicle structure or vehicle roof is necessary; a fixation to the rear door is sufficient. Thus the fixation can be created quickly and independently of the roof type or configuration of the roof structure. Preferably the roof spoiler is attached only to the upper edge of the rear door, e.g. by vertical hanging, which allows a rapid mounting process without occupying the outer face of the rear doors.

The fixing device can be formed economically e.g. as one piece, for example as a metal plate with corresponding formation of insert rods or insert regions, wherein the roof air guide element can be formed for example as a plastic injection molding with one or more rearward protruding cams with rounded cam face.

Surprisingly easily, this achieves an economic formation with simple mounting on only the rear door, and an automatic adjustment process on opening and closing of the rear door.

According to the invention, in particular thus synergy effects occur between the formation of the roof spoiler and the side spoiler, since on opening of the rear door, first the roof spoiler is automatically retracted (pivoted down); this then allows the positioning of the swing arm and side air guide elements, where in all cases the swing arm can be formed vertically shorter so that it lies only on the rear door and in the vertical direction does not extend as far as the roof air guide element. The rearward protruding cam does not obstruct the pivot movement or the positioning of the side spoiler.

Thus on opening of the rear door, first an automatic downfolding or downward pivoting of the roof air guide element takes place under its own weight, without adversely affecting the side spoilers. Then the side spoilers can be completely folded out as described above.

The invention is now explained below with reference to the enclosed drawings showing some embodiments.

BRIEF DESCRIPTION OF THE DRAWINGS

In the drawings,

FIG. 7b shows a detail of FIG. 7a indicated by a broken-line oval.

DETAILED DESCRIPTION OF THE DRAWINGS

Figure 1:
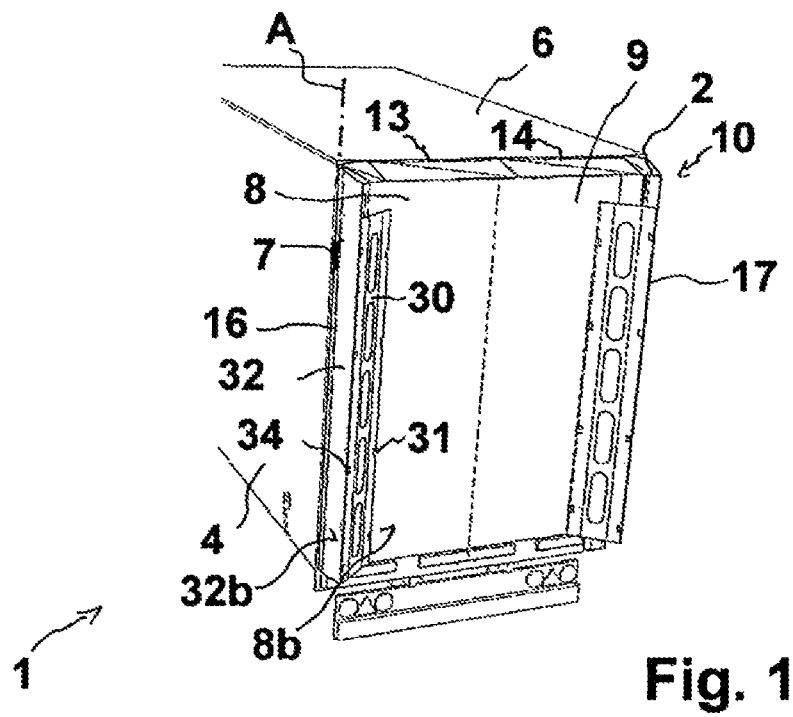
FIG. 1 shows a truck in perspective rear view with closed rear doors, with a rear spoiler device according to one embodiment, in the driving position.
Figure 2:
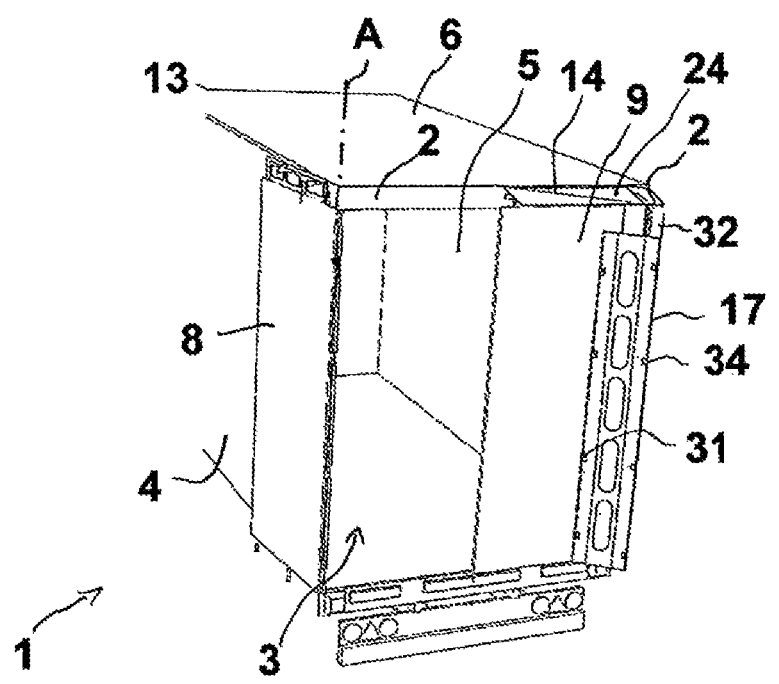
FIG. 2 shows a rear view corresponding to FIG. 1 with a rear door open.

According to FIGS. 1 and 2, a truck 1 has a vehicle structure 2 which in the rear region is also known as a portal, and a loading space 3 which is limited towards the outside by side walls 4, 5 and to the top by a vehicle roof 6; the side walls 4, 5 and the vehicle roof 6 can be formed solid, e.g. in a van, or as supporting parts and be connected correspondingly fixedly to the vehicle structure 2; furthermore it is also known to form the side walls 4, 5 and optionally also the vehicle roof 6 from tarpaulins.

The loading space 3 can be closed at the rear by two rear doors 8, 9 which, starting from their closed position in FIG. 1, can pivot out about their hinge 7 through around 270° about their respective pivot axis A and can be laid or also locked e.g. on the respective side wall 4, 5.

A rear spoiler device 10 is mounted on the truck 1 and comprises two roof spoilers 13, 14 and two side spoilers 16 and 17.

Figure 5:
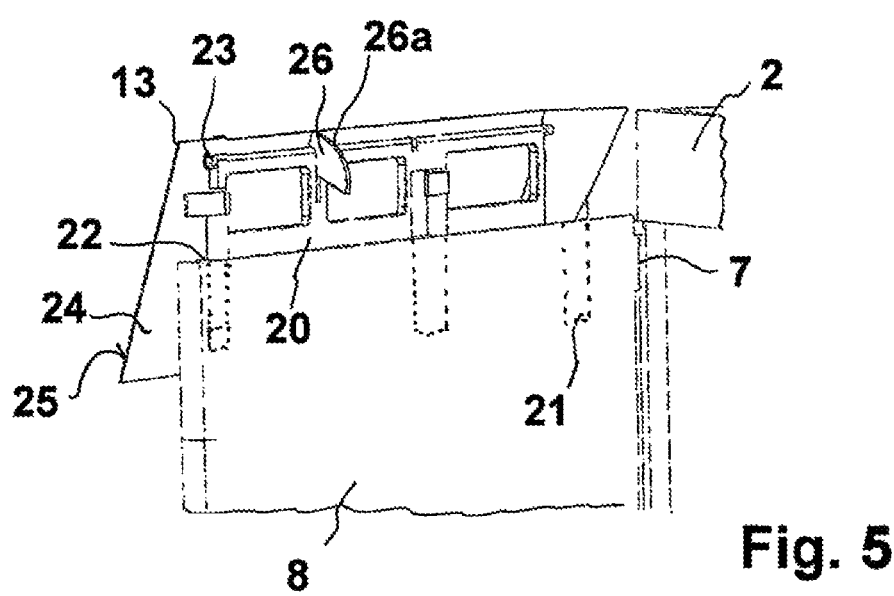
FIG. 5 shows the rear view of the vehicle door with roof spoiler according to one embodiment.

The two roof spoilers 13, 14 are advantageously attached exclusively to the two rear doors 8, 9 in that they are inserted from above. According to FIG. 5, the left roof spoiler 13 (viewed in the direction of travel) has a fixing device 20 (bearing part) which is attached to the rear door 8; for this the fixing device 20 can have for example three vertically downwardly extending insert rods 21 which are placed in the rear door 8 from above; if the rear door 8 is already open at its top, the insert rods 21 can accordingly be inserted directly; if the door leaf is closed, first holes 22 must be drilled in the upper edge 8*a* of the rear door and then the insert rods 21 inserted in these holes from above.

Furthermore the fixing device 20 has a rotary axis 23 for a roof air guide element 24. The roof air guide element 24 is made as a one-piece plastic part e.g. a plastic injection molding, with flat or slightly curved outer face 25, the shaping of which is known in itself. When the rear door 8 is closed, the roof air guide element 24 substantially forms an extension to the vehicle roof 6, e.g. with a slight downward curvature. Furthermore the roof air guide element 24 has one or more cams 26 which are formed e.g. with said cams on injection molding.

Figure 4:
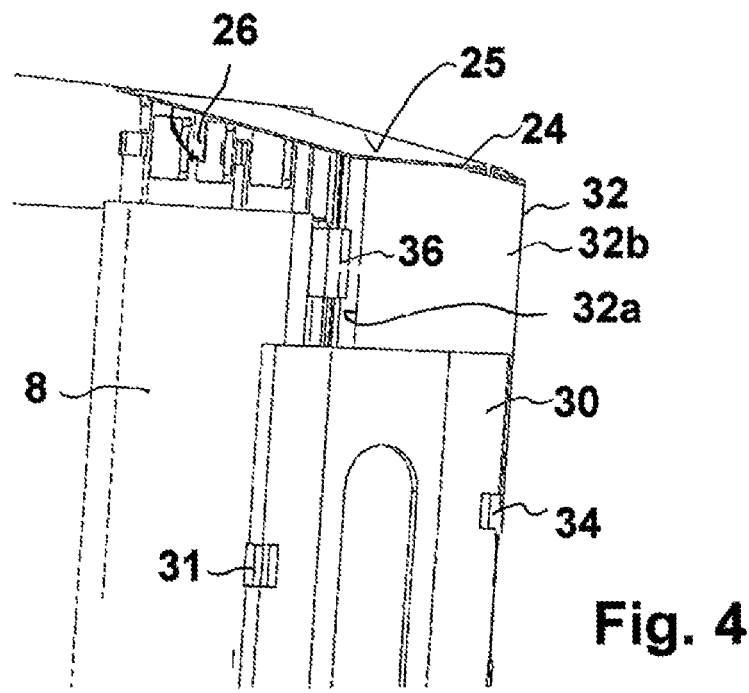
FIG. 4 shows a perspective view of the rear spoiler device from behind.

The fixing device 20 can e.g. be made of steel or plastic. The entire roof spoiler 13 in the embodiment shown is formed e.g. of two pieces with the fixing device 20 and the roof air guide element 24, where applicable with additional rotary axis 23. When the fixing device 20 is anchored in the rear door 8, the cam 26 protrudes to the rear; the air guide element 24 is pivoted down under its own weight about the rotary axis 23 and lies e.g. against the rear door 8. When the rear door 8 is then closed from its open position shown in FIG. 5 into the driving position in FIG. 4, first the rearward protruding cam 26 contacts the vehicle structure 2, e.g. a crossmember, in the upper rear region of the truck 1. The cam 26 here has a curved cam face 26*a* which rolls on the vehicle structure 2 when the rear door 8 is closed so that the entire roof air guide element 24 pivots upward about the rotary axis 23.

When the rear door 8 is closed, the cam 26 with its cam face 26*a* still lies on the vehicle structure 2 and is therefore supported in its upward protruding position by the cam 26 or multiple cams 26. When the rear door 8 is then opened again, the cam 26 rolls on the vehicle structure 2 and again protrudes to the rear, the roof air guide element 24 thus drops automatically, because of its own weight, from its function position with closed rear door 8 into the down-pivoted or down-folded base position in FIG. 5. No activation by the user is therefore required.

The two side spoilers 16, 17 each have a swing arm 30 and a side air guide element 32. The swing arm 30 is for example fixed e.g. in four first pivot joints 31 to the outside 8*b* of the rear door 8, for which reason e.g. holes 33 can be drilled in the rear door 8. The side air guide element 32 is in turn fixed to the swing arm 30 via second pivot joints 34. The swing arm 30 can be made for example of metal, e.g. aluminum or steel; the side air guide elements 32 is again advantageously made of plastic, e.g. as an injection molding.

The side air guide elements 32 are each engaged in a locking arrangement 36, 40 in corresponding retaining recesses 37, 42 on the truck 1. According to alternative embodiments, this locking or engagement can take place either according to FIG. 7 on the respective rear door 8, 9, or according to FIG. 6 7 on the vehicle structure 2 or on the side walls 4, 5.

Figure 7A:
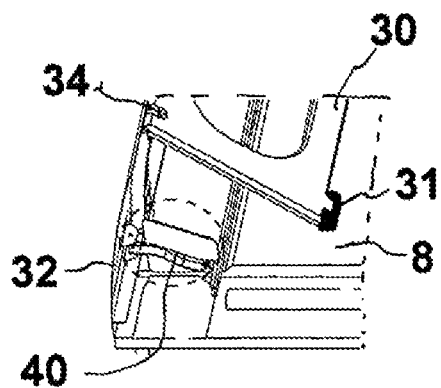
FIGS. 7a and 7b show an embodiment with locking of the side air guide element on the rear door, where
Figure 7B:
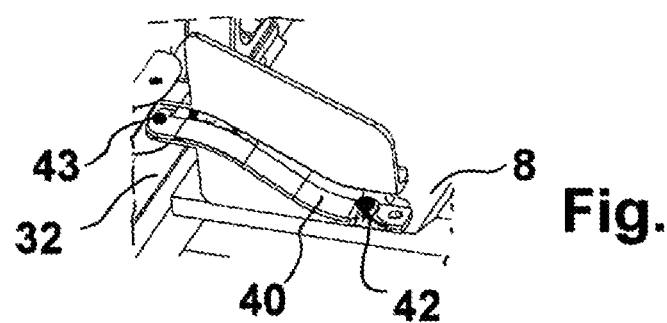

In the embodiment of FIG. 7 with locking on the rear door 8, i.e. the door leaf itself, a locking tab 40 can be provided for example in the region of the front edge 32*a* of the side air guide element 32, or an additional component mounted here which can engage in a locking pin 42 serving as a retaining receiver and mounted on the rear door 8 or on the outside 8*b* of the rear door 8. According to FIG. 7 therefore the front edge 32*a* terminates flush with the side wall 3, wherein a secure fixation to the rear door 8 is however possible via the locking tab 40 protruding towards the middle. The locking tab 40 can be made of metal or plastic; it can for example be fixed to a corresponding receiver on the side air guide element 32 by a screw 43 or a bolt.

Figure 6A:
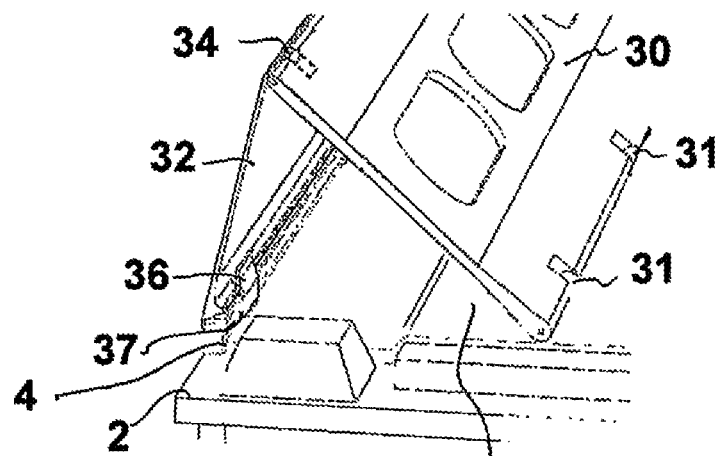
FIGS. 6a, 6b, and 6c show steps of the initial adjustment of the side spoiler on opening of the rear door and locking of the side air guide element on the vehicle structure.
Figure 6B:
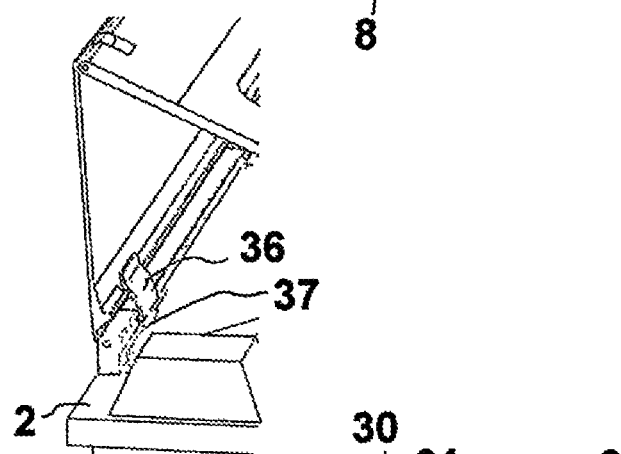
Figure 6C:
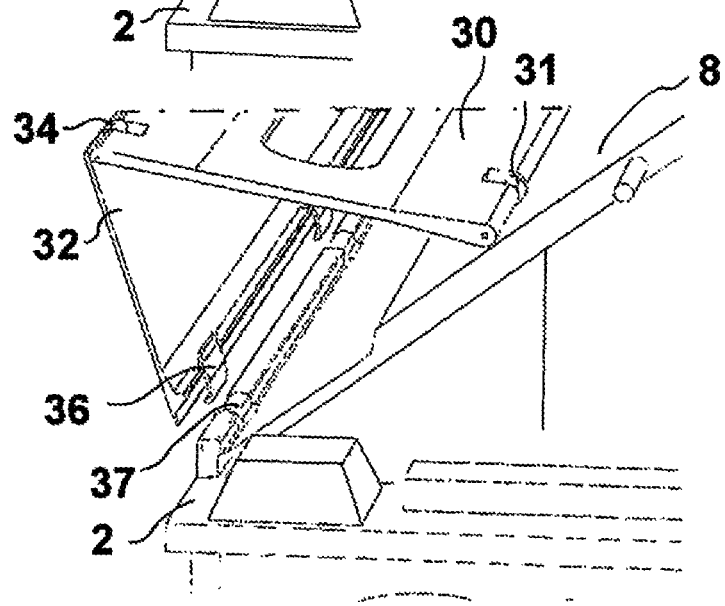

In the embodiment in FIG. 6, a catch hook (locking hook) 36 is mounted on the end of the side air guide element 32 as the locking means, and locks in a retaining receiver 37 on the side wall 4 or the vehicle structure 2.

The side air guide elements 32 form an extension of the side walls 4, 5, as is normal for side spoilers; for this the side air guide elements 32 can have a flat or suitably curved form. The pivot joints 31, 34 are advantageously—as shown in the figures—formed at the ends of the swing arms 30. Accordingly the second pivot joints 34 and the locking arrangement 36, 40 are advantageously provided in the end regions of the side air guide elements 32.

The swing arm 30 and the side air guide element 32 therefore, together with the vehicle 1—according to FIG. 7, with the rear door 8 or 9 of the vehicle 1—form a stable triangle, the corners of which are formed by the two pivot joints 31, 34 and the catch connection between the locking arrangement 36, 40 and the retaining receiver 37 or locking pin 42.

From the driving position, the rear spoiler device 10 is folded into its base position in that first the rear doors 8, 9 are opened slightly. This causes the respective left and right roof air guide elements 24 of the roof spoiler 13, 14 to drop down and thus lie against the respective rear door 8, 9. By opening the rear doors 8 and 9, in the embodiment in FIG. 6 in position a), an automatic release of the locking hook 36 from the locking receiver 37 can already take place. However a configuration is also possible with manual release. If the side air guide element 2 is fixed to the locking pin 42 of the rear door 8 or 9 as shown in FIG. 7, a manual unlocking is always provided.

Figure 3:
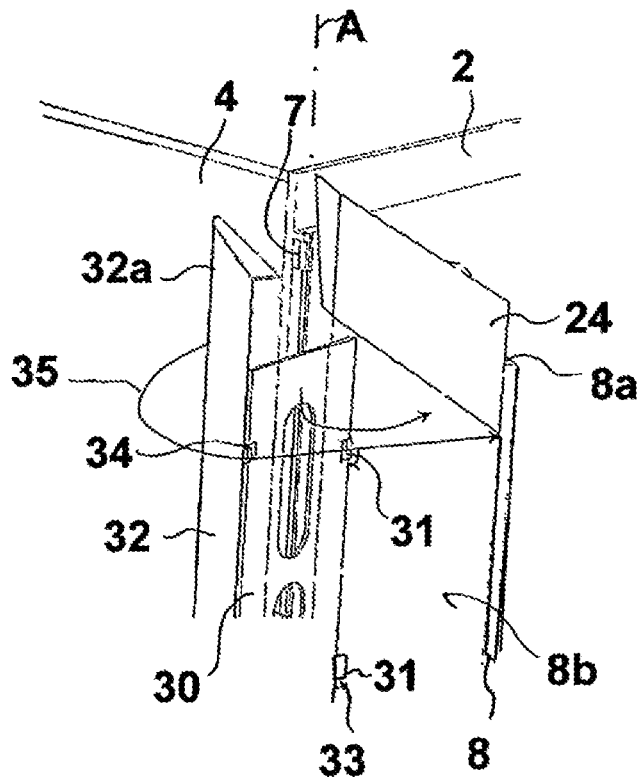
FIG. 3 shows an enlarged extract with the rear door partly open.

The entire side spoiler 16, 17 is now folded in towards the middle in that e.g. a user takes hold of the respective side air guide element 32 and pivots it inward in a large pivot movement, such that the side air guide element 32 pivots about the second pivot joint 34 on the swing arm 30 and pivots the swing arm 30 in the first pivot joints 31 against the rear door 8 or 9. In this movement into the base position, the swing arm 30 is moved e.g. by around 100° and the side air guide element 32 is pivoted in relation to the swing arm 32 by a further 100° for example. In FIG. 3, the movement track 35 of the front edge 32*a* of the side air guide element 32 in shown. The swing arms 30 can preferably come to lie directly flat against the rear doors 8 and 9; the side air guide element 32 in its upper region can come to rest on the respective down-folded roof air guide element 24.

Then the rear doors 8, 9 are folded completely out about their swivel axes A through a total pivot angle of around 270°. The rear spoiler device 10 with roof spoilers 13, 14 and side spoilers 16, 17 is thus accommodated between the rear door 8 or 9 and the side wall 3 or 4.

In the locked or engaged driving position, the front edge 32a of the side air guide element 32 lies advantageously on or behind the vehicle structure 2. Thus an outer face 32b (air guide face) of the side air guide element 32 lies flush with the left side wall 4 so that no turbulence is formed in the transitional region.

While the above description constitutes the preferred embodiments of the present invention, it will be appreciated that the invention is susceptible to modification, variation and change without departing from the proper scope and fair meaning of the accompanying claims.

The invention claimed is:

1. A rear spoiler device (10) for a vehicle (1) with at least one rear door (8, 9),
   the rear spoiler device (10) comprising at least one side spoiler (16, 17) with at least one side air guide element (32) which can be moved between a driving position for contour extension and aerodynamic air guidance when the rear door (8, 9) is closed, and a base position when the rear door (8, 9) is open,
   wherein each of the at least one side spoiler (16, 17) has a swing arm (30) with a plurality of first pivot joints (31) at various heights of the swing arm for pivotable fixing on the rear door (8, 9),
   wherein the side air guide element (32) is mounted adjustably via the swing arm (30) on the rear door (8, 9), and
   wherein the side air guide element (32) has a locking arrangement (36) on its front end region (32a) for releasable and lockable fixing to the truck (1).

2. The rear spoiler device as claimed in claim 1,
   wherein the side air guide element (32) is mounted pivotably on the swing arm (30) via at least one second pivot joint (34),
   wherein the at least one second pivot joint (34) is arranged on or between a rear end of the side air guide element (32) and a rear end of the swing arm (30).

3. The rear spoiler device as claimed in claim 2, wherein it has multiple vertically spaced second pivot joints (34) or multiple vertically spaced locking arrangements (36) which can be released and locked manually or both.

4. The rear spoiler device (10) as claimed in claim 2, wherein in the driving position, the swing arm (30), the side air guide element (32) and the vehicle (1) can form a triangle, the corners of which are formed by the at least one first pivot joint (31), the at least one second pivot joint (34) and the at least one locking arrangement (36).

5. The rear spoiler device (10) as claimed in claim 1, wherein multiple vertically spaced first pivot joints (31) are provided for fixing in holes (33) of the rear doors (8, 9).

6. The rear spoiler device (10) as claimed in claim 1, wherein the locking arrangement (36) can be locked to a vehicle structure (2) or a side wall (4, 5) of the vehicle (1).

7. A rear spoiler device (10) for a vehicle (1) with at least one rear door (8, 9),
   the rear spoiler device (10) comprising at least one side spoiler (16,17) with at least one side air guide element (32) which can be moved between a driving position for contour extension and aerodynamic air guidance when the rear door (8, 9) is closed, and a base position when the rear door (8, 9) is open,
   wherein the side spoiler (16, 17) has a swing arm (30) with a first pivot joint (31) for a pivotable fixing on the rear door (8, 9),
   wherein the side air guide element (32) is mounted adjustably via the swing arm (30) on the rear door (8, 9), and
   wherein the side air guide element (32) has a locking arrangement (36) on its front end region (32a) for a releasable and lockable fixing to the truck (1), wherein the locking arrangement (36) can be locked to a vehicle structure (2) or a side wall (4, 5) of the vehicle (1) and is unlocked automatically when the rear doors (8,9) swing open.

8. The rear spoiler device (10) as claimed in claim 1, wherein the locking arrangement (36) is configured to be locked to the rear door (8, 9) of the vehicle (1).

9. The rear spoiler device (10) as claimed in claim 8, wherein the locking arrangement (36) has a locking part (40) extending laterally toward the center of the vehicle (1), for releasable locking to a door-side retaining receiver (42).

10. The rear spoiler device (10) as claimed in claim 1, further comprising at least one roof spoiler (13, 14) with a roof air guide element (24),
    wherein the roof spoiler (13, 14) is configured for fixation to a rear door (8, 9) without fixation to the vehicle structure (2),
    wherein the roof air guide element (24) is automatically erected into its driving position on closure of the rear doors (8, 9) and automatically moved into a rest position on opening of the rear doors (8, 9).

11. The rear spoiler device (10) as claimed in claim 10, wherein
    the roof spoiler (13, 14) has a fixing device (20) for fixing to the rear door (8, 9), and a roof air guide element (24) is mounted pivotably on the locking arrangement (20),
    wherein the roof air guide element (24) has a support arrangement (26) for support on the vehicle structure (2) of the vehicle when the rear doors are closed and for moving the roof air guide element (24) into its driving position when the rear doors (8) are closed, and
    wherein when the rear doors are opened, the roof air guide element (24) can be pivoted under its own weight down into its base position with the support arrangement (26) protruding to the rear.

12. The rear spoiler device (10) as claimed in claim 11, wherein the support arrangement is a cam (26) which is formed integrally with or is connected to the roof air guide element (24) and has a cam face (26a) for support on the vehicle structure (2) and for rolling on the vehicle structure (2) during pivoting of the cam (26) when the rear door (8) is closed.

13. The rear spoiler device (10) as claimed in claim 11, wherein the fixing device (20) is configured for fixing to an upper edge (8a) of the rear door (8).

14. The rear spoiler device (10) as claimed in claim 11, wherein the fixing device (20) has a rotary axis (23) in which the roof air guide element (24) is pivotably mounted, and an insert arrangement (21) for insertion in the upper edge (8a) of the rear door (8).

15. The rear spoiler device (10) as claimed in claim 1, comprising two side spoilers (16, 17) and two roof spoilers (13, 14) for fixing to two rear doors (8, 9), wherein in the base position when the rear doors (8, 9) are open, each of the two side spoilers supporting a respective one of the two roof spoiler.

16. A vehicle with rear doors comprising:
a rear spoiler device (10) as claimed in claim 15 arranged on a rear region of the vehicle,
wherein the rear doors (8, 9) of the vehicle (1) can be folded out after unlocking from their closed position and configured to be laid against or locked to a side wall (4, 5) of the vehicle (1),
wherein each side air guide element (32), after unlocking of the locking arrangement (36), is pivotable about the second pivot joint (34) and the swing arm (30) is pivotable about the first pivot joint (31).

17. The rear spoiler device as claimed in claim 3, wherein the multiple vertically spaced locking arrangements (36) are catch hooks (36), for locking in retaining receivers (37, 42) of the vehicle (1).

18. The rear spoiler device (10) as claimed in claim 9, wherein the locking part (40) is a locking tab (40) and the door-side retaining receiver (42) is a locking pin (42).

19. The rear spoiler device (10) as claimed in claim 14, wherein the insert arrangement (21) includes vertically downwardly extending insert rods (21).

* * * * *